Dec. 18, 1956 E. HEINECKE 2,774,874

CIRCUIT ARRANGEMENT TO NEUTRALIZE THE GRID-TO-ANODE CAPACITY IN SCREEN-GRID TUBES

Filed Aug. 20, 1954

INVENTOR
E. HEINECKE
BY Philip M. Bolton
ATTORNEY

United States Patent Office 2,774,874

Patented Dec. 18, 1956

2,774,874

CIRCUIT ARRANGEMENT TO NEUTRALIZE THE GRID-TO-ANODE CAPACITY IN SCREEN-GRID TUBES

Erich Heinecke, Berlin-Tempelhof, Germany, assignor to International Standard Electric Corporation, New York, N. Y., a corporation of Delaware Application August 20, 1954, Serial No. 451,189

Claims priority, application Germany August 21, 1953

4 Claims. (Cl. 250—36)

This invention relates to circuit arrangements for neutralizing the grid-anode capacity in screen-grid tubes.

Many forms of compensating or neutralizing circuits are known in which the stray interelectrode capacity is compensated. However, in most known forms, additional circuit elements are required which add to the cost and complexity of the circuit.

Accordingly, it is an object of this invention to provide a neutralizing means which is simpler and more efficient than neutralizing circuits heretofore known.

The above-mentioned and other features and objects of this invention and the manner of attaining them will become more apparent and the invention itself will be best understood, by reference to the following description of an embodiment of the invention taken in conjunction with the accompanying drawings, wherein.

Figure 1:
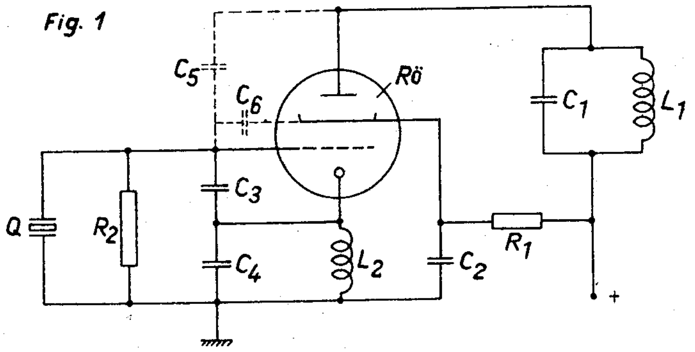
Fig. 1 is a circuit diagram of a conventional self-excited oscillator.

Referring now to Fig. 1, there is illustrated a self-excited oscillator circuit of the conventional design. The screen grid of tube $R_0$ is grounded over a condenser C2. The oscillations are generated by the grid circuit of the tube. The grid circuit comprises condensers C3, C4 and a quartz crystal Q. In respect of the frequency there produced, the crystal is in the nature of a certain inductive resistance. If the screen grid is looked upon as the anode of a triode then it will be seen that the arrangement is a normal three-point connection. Resistance R2 serves for direct-current grid leak. Inductance L2 serves to supply direct current to the cathode.

The anode circuit from which power is obtained comprises a condenser C1 and an inductance L1. Over this circuit the direct anode voltage is supplied, while over resistance R1 the direct-screen grid voltage is supplied to tube $R_0$.

In this circuit, a capacitive coupling, indicated by the anode-grid capacity illustrated in dashed lines, is effective between the oscillatory anode-circuit and the oscillatory grid-circuit, so that there is an interaction between these two, with the result, for instance, that changes in the tuning of the anode circuit will cause the total frequency and the crystal loading to change. C6 denotes the capacity between screen grid and control grid. With driven circuits of the normal design, such as those having a directly grounded cathode, this coupling capacity also brings about a disturbing effect on the grid circuit. Also it is possible for parasitic oscillations to be occasioned by this capacity.

The invention avoids these shortcomings by grounding the oscillatory circuit (interposed between anode and screen grid) at an intermediate potential; e. g., by dividing either the capacitance or the inductance of this circuit. In this way the screen grid is not of zero potential but of a potential displaced by some 180° with respect to the anode potential. The grounding point of the circuit should be so chosen that the effect of the anode on the control grid and the effect of the screen grid on the control grid shall annul each other.

Figure 2:
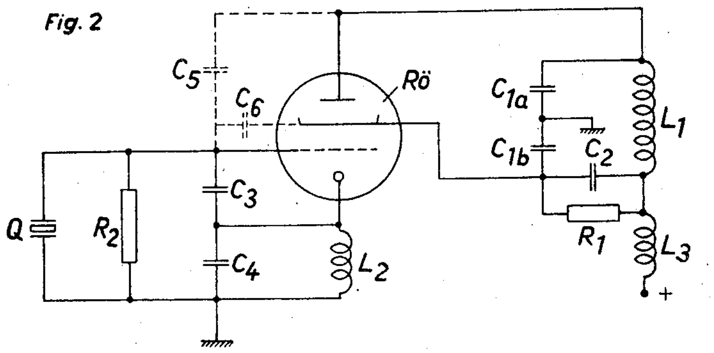
Fig. 2 is a circuit diagram of one embodiment of the invention.

Referring now to Fig. 2 showing one embodiment of the invention, the capacitance C1 of the oscillatory circuit is subdivided into two component capacitances C1*a*, C1*b*. The point at which C1*a* and C1*b* are interconnected is grounded. The screen grid is joined to condenser C1*b* on that side thereof which is remote from the grounding point between C1*a* and C1*b*. Condenser C2, resistance R1, and self-inductance L3 do not affect the HF circuit and merely serve to supply direct voltage to the anode and to the screen grid.

Figure 3:
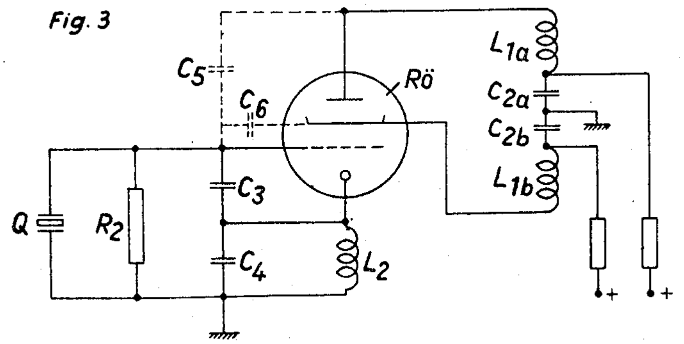
Fig. 3 is a circuit diagram of another embodiment of the invention.

In Fig. 3 the inductance of the oscillatory circuit is divided; the component inductances are designated L1*a*, L1*b*. The condensers C2*a*, C2*b* are here merely arranged to separate and to supply the direct voltages. They do not affect the oscillatory circuit proper.

The ratio between C1*a* and C1*b*, Fig. 2, and that between L1*a* and L1*b*, Fig. 3, must correspond to the ratio between the anode-grid capacity C5 and the screen-grid to control-grid capacity C6, whereby the effects on the control grid shall compensate each other.

A special advantage of this circuit is that the screen-grid is not of zero potential but of a small potential which is the reverse of the anode potential. This fact is easily understood when the $U_a/I_a$ characteristic field of tetrodes or pentodes is considered. For example, if the respective curves are plotted to show the variation in screen-grid and anode voltages which are due to the circuitry, then the characteristic curves are practically horizontal as a result of the screen-grid voltage decreasing with increasing anode voltage. The horizontal characteristic curves indicate that the reciprocal of the amplification factor, has been entirely annulled.

What is claimed is:

1. A neutralizing arrangement for an oscillator circuit, comprising an electron discharge device having cathode, grid, screen grid and anode electrodes, an L-C oscillatory circuit coupled across said anode and screen grid electrodes; and means for neutralizing the stray capacities between said anode-grid electrodes and said screen grid-grid electrodes, characterized in that one of the reactances forming said L-C circuit comprises a pair of components, means coupling the junction of said components to a reference potential with respect to said anode and screen grid electrodes whereby the voltage at said anode is approximately of opposite phase to the voltage at said screen grid.

2. The arrangement according to claim 1 wherein the values of said components are predetermined and selected so that the ratio, $$\frac{X_1}{X_2}=\frac{Ca\text{—}g}{Cs\text{—}g}$$

where $X_1$ is the component closer to the anode, $X_2$ is the other component, *Ca—g* is the stray capacity between anode-grid electrodes and *Cs—g* is the stray capacity between screen grid-grid electrodes.

3. The arrangement according to claim 2 wherein said components are capacitors.

4. The arrangement according to claim 2 wherein said components are inductances.

References Cited in the file of this patent

UNITED STATES PATENTS

| | | |
|---|---|---|
| 1,921,844 | Schumacher | Aug. 8, 1933 |
| 1,973,303 | Appleton | Sept. 11, 1934 |
| 2,066,902 | Reinartz | Jan. 5, 1937 |
| 2,100,756 | Shepard | Nov. 30, 1937 |